METHOD OF MAKING BAND SAW BLADE

Original Filed Dec. 7, 1964 3 Sheets-Sheet 1

Inventors
Royal A. Anderson
Eugene N. Connoy
By
Attorneys

METHOD OF MAKING BAND SAW BLADE

Original Filed Dec. 7, 1964 3 Sheets-Sheet 2

Inventors
Royal A. Anderson
Eugene N. Connoy
By [illegible] Jones
Attorney

METHOD OF MAKING BAND SAW BLADE

Original Filed Dec. 7, 1964 3 Sheets-Sheet 3

Inventors
Royal A. Anderson
Eugene N. Connoy
By
Attorney

United States Patent Office

Re. 26,676
Reissued Sept. 30, 1969

26,676

METHOD OF MAKING BAND SAW BLADE

Royal A. Anderson, Northbrook, Ill., and Eugene N. Connoy, Minneapolis, Minn., assignors to Contour Saws, Inc., Des Plaines, Ill., a corporation of Illinois Original No. 3,315,548, dated Apr. 25, 1967, Ser. No. 416,367, Dec. 7, 1964. Application for reissue Apr. 25, 1969, Ser. No. 822,078

Int. Cl. B23d *63/00*

U.S. Cl. 76—112 6 Claims

Matter enclosed in heavy brackets [ ] appears in the original patent but forms no part of this reissue specification; matter printed in italics indicates the additions made by reissue.

*ABSTRACT OF THE DISCLOSURE*

*A method of making bi-metal band saw blades which consists in electron beam welding a wire of high speed steel to one edge of a band of alloy steel, annealing and straightening the resulting bi-metal band stock, milling saw teeth into the bi-metal band stock with only the tips of the teeth of high speed steel, and hardening the thus formed saw blade to the critical hardening temperature of high speed steel followed by tempering.*

This invention relates to the production of band saw blades and, more particularly, to metal cutting band saw blades.

Manufacturers of band saws have long known and appreciated that the ideal band saw blade is one in which the tips of the teeth are formed of high speed cutting tool steel, or its functional equivalent, and all the remainder of the blade—including that portion of each tooth below its high speed steel tip—is formed of a steel alloy possessing the properties characteristic of spring steel, so as to be capable of withstanding shock and have high resistance to fatigue failure.

The attainment of that ideal saw blade or, more accurately, a commercially practicable way of producing it, has been an objective of the industry for a long time, and while substantial progress toward that end has been made in the past, it was not until the discovery upon which this invention rests that the ultimate goal was realized.

Examples of recent steps in the right direction will be found in the W. T. Anderson Patent No. 2,786,788, the Connoy Patent No. 3,063,310, and the Connoy et al. Patent No. 3,089,945. But despite the improvements which the inventions of those patents produced, the demand for further improvement persisted.

Those most skilled in the art have always realized that if a wire of high speed tool steel could be secured to an edge of a strip or band of tough flexible steel with the bond therebetween as strong as the band, and if this could be done with minimum distortion and without incurring insurmountable straightening problems; if the teeth could be formed on the bimetal band stock by milling rather than grinding; and, most of all, if all this were possible without complicating the heat treatment required to bring the tooth tips to their ultimate correct hardness, then the long sought goal would have been reached.

In a sense, therefore, it might be said that the purpose and object of this invention is to find some way of adapting the old concept of the Blum Patent No. 1,535,096, to a commercially practicable and feasible procedure, for in the Blum patent, as in the present invention, a high speed tool steel wire of relatively small cross section is secured directly onto one edge of a strip or band of carbon steel; but for band saw blade stock which must be provided in long lengths, this cannot be done by the resistance welding technique employed by Blum. One of the instant joint applicants made many attempts to do this but simply met with failure upon failure. The same discouraging results also must have been experienced by A. V. Bernstein, the inventor and assignee of Patent No. 3,034,379, since he found that:

"the welding of the high speed steel directly to the common or low alloy steel results in a welding joint containing hard brittle portions due to a partial melting of the steel during welding."

To avoid this objectionable condition, Bernstein interposed a thin strip of stainless austenitic steel between the high speed steel wire and the carbon steel backing band, but this "sandwiching" of a stainless steel strip between the backing band and the high speed steel wire has serious objections. Not only does it introduce production problems, but more significantly the presence of the austenitic material in the weld zone inevitably creates a soft, weak structure at the very point where utmost strength is needed. In addition, this "sandwiching" approach introduces heat treating problems which the Bernstein patent leaves unanswered.

By contrast, this invention enables welding a high speed tool steel wire directly to an edge of a carbon steel backing strip or band without entailing any metallurgically objectionable structure in the weld zone, and without causing warping and camber to the extent that the attainment of acceptable straightness is impossible, which was one of the difficulties experienced in all previous attempts to produce bimetal band saw blade stock in commercially practicable lengths.

But perhaps the most gratifying consequence of this invention resides in the fact that now, for the first time, it is possible with a single temperature heat treatment over which control can be exercised, to give the back of the band and all portions of each tooth below its high speed tool steel tip, the desired spring temper and the tips of the teeth the maximum hardness attainable with the chosen high speed steel.

Another very significant advantage of this invention is that it permits any high speed steel to be used for the tip material, the only limitation in this respect being that the steel chosen be capable of being drawn into wire, and almost all grades of high speed tool steel are now available in this form.

It has been discovered that all of the aforesaid objectives and advantages can be achieved through the use of the new electron beam process. In this new technique, a highly concentrated sharp focused beam of electrons is caused to impinge upon the workpiece. The high kinetic energy resulting from the extremely high velocity imparted to the electrons, when transferred to the lattice electrons of the workpiece, generates higher [lattic] *lattice* vibrations which produce an increase in temperature within the impingement area sufficient to accomplish work. The process and a machine for practicing it are disclosed in the Steigerwald Patent No. 2,793,281, issued May 21, 1957.

The adaptation of the electron beam technique to the production of bimetal band saw blades will now be described with reference to the accompanying drawings which illustrate one mode of practicing this invention, and in which.

The production of band saw blade in accordance with the method of this invention begins with the selection and procurement of band or strip stock for the backing and the selection and procurement of the high speed steel wire which is to be welded to one edge of the band.

As indicated hereinbefore, any high speed steel that can be drawn into square wire may be employed. Both M2 and M3 wire has been used. The analysis of these high speed steels is undoubtedly well known to those skilled in the art, but for quick reference, the Connoy Patent No. 3,063,310, may be consulted.

The steel used for the backing must have the following characteristics:

(1) It should be air hardening;
(2) It should tolerate a hardening temperature of 2150–2275° F.;
(3) Its alloy content should be such that final hardness after two tempers at 1050° F. is in the 44–46 Rockwell C range;
(4) It must have excellent fatigue resistance; and
(5) It should be low in cost.

The steel alloy identified by the AISI–SAE number 6150 has been found to be entirely satisfactory, but those skilled in the art will undersand that steel alloys other than this one will meet the requirements and hence can be employed.

Figure 4:
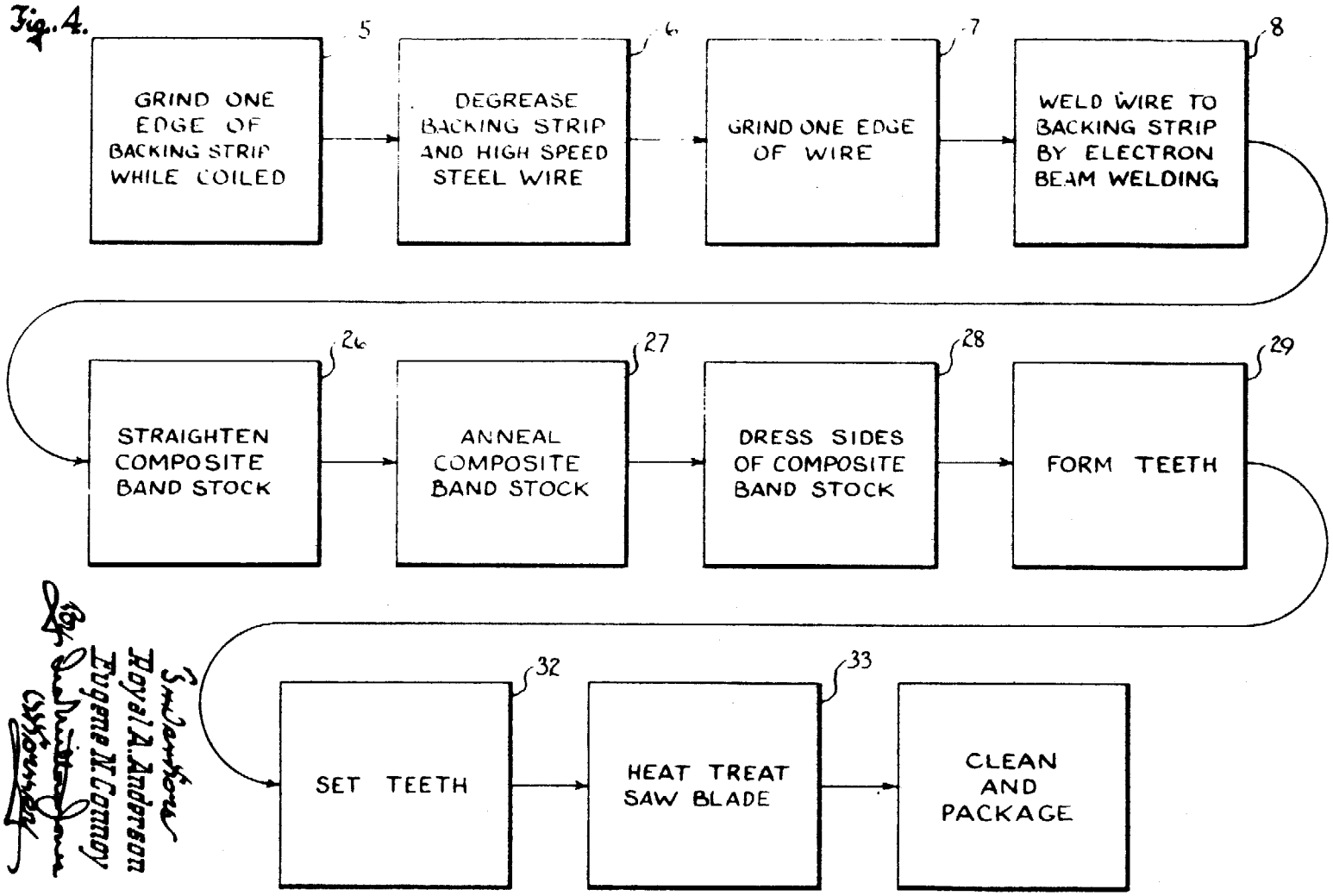
FIGURE 4 is a block diagram depicting the sequence of steps involved in the complete method of this invention.

The first step in the method, as indicated by the block 5 on the sequence diagram FIGURE 4, consists in grinding one edge of the backing strip material. This is preferably done with the stock tightly coiled and on a Blanchard grinder. After being thus ground, the backing strip material and also the high speed steel wire are degreased in any conventional way, as indicated by block 6 of FIGURE 4.

One edge of the wire is then ground flat and smooth—block 7 of FIGURE 4—also in any conventional way and by means of any suitable grinding apparatus. The backing strip and wire are now ready for the welding operation by which they are secured together.

The welding—block 8 of FIGURE 4—is done by the electron beam process, and while other machines may be suitable for the purpose, it was found that the electron beam welder manufactured by Hamilton Standard, a division of United Aircraft Corporation, under the aforesaid Stigerwald Patent No. 2,793,281, is entirely suitable for the purpose. This machine, as diagrammatically illustrated in FIGURE 1, comprises an electron beam column, indicated generally by the numeral 10, mounted on the top wall of a vacuum chamber 11. The column 10 contains means, not shown, for emitting electrons, focusing the electrons into a beam, and accelerating them to extremely high velocity. By means of an electromagnetic lens, also not shown, but located in the base of the column and controlled from an instrument panel 12, the operator can focus the beam onto the work inside the vacuum chamber 11, with a spot size of less than .015 inch at maximum power and of less than .005 inch at a lower power level.

A door in one end of the vacuum chamber permits a work-carrying fixture 13 riding on rails 14, to be moved into and out of the vacuum chamber. This fixture carries a coil of the flexible back-forming strip material or band 15 and a coil of the high speed steel wire 16, and has means for advancing both the band and the wire lengthwise along defined paths which intersect one another edgewise with respect to the band. For this purpose the fixture 13 mounts a reel 17, on which the coil of high speed wire is wound, and a pair of reels 18 and 19, the former carrying the coil of flexible back-forming strip material or band 15 and the latter having the welded bimetal blade stock coiled thereon as the welding operation proceeds.

Power driven means of any conventional type, including feed rolls 20–20′ continually draw the strip or band 15 off the reel 18 and at the same time pull the wire 16 off the reel 17, and suitable guide means 21 direct the advancing strip or band and the wire between the clamping rolls 22–22′, with the ground edges of the band and wire facing each other so that the clamping rolls press these edges together. Preferably the fixture also includes a wire straightener 23 of suitable construction, through which the wire is drawn as it approaches the band.

The power means for advancing the band and wire is, of course, controllable to enable adjustment of the rate at which both move through the welding zone which is located just downstream of the clamping rolls 22–22′.

Figure 1:
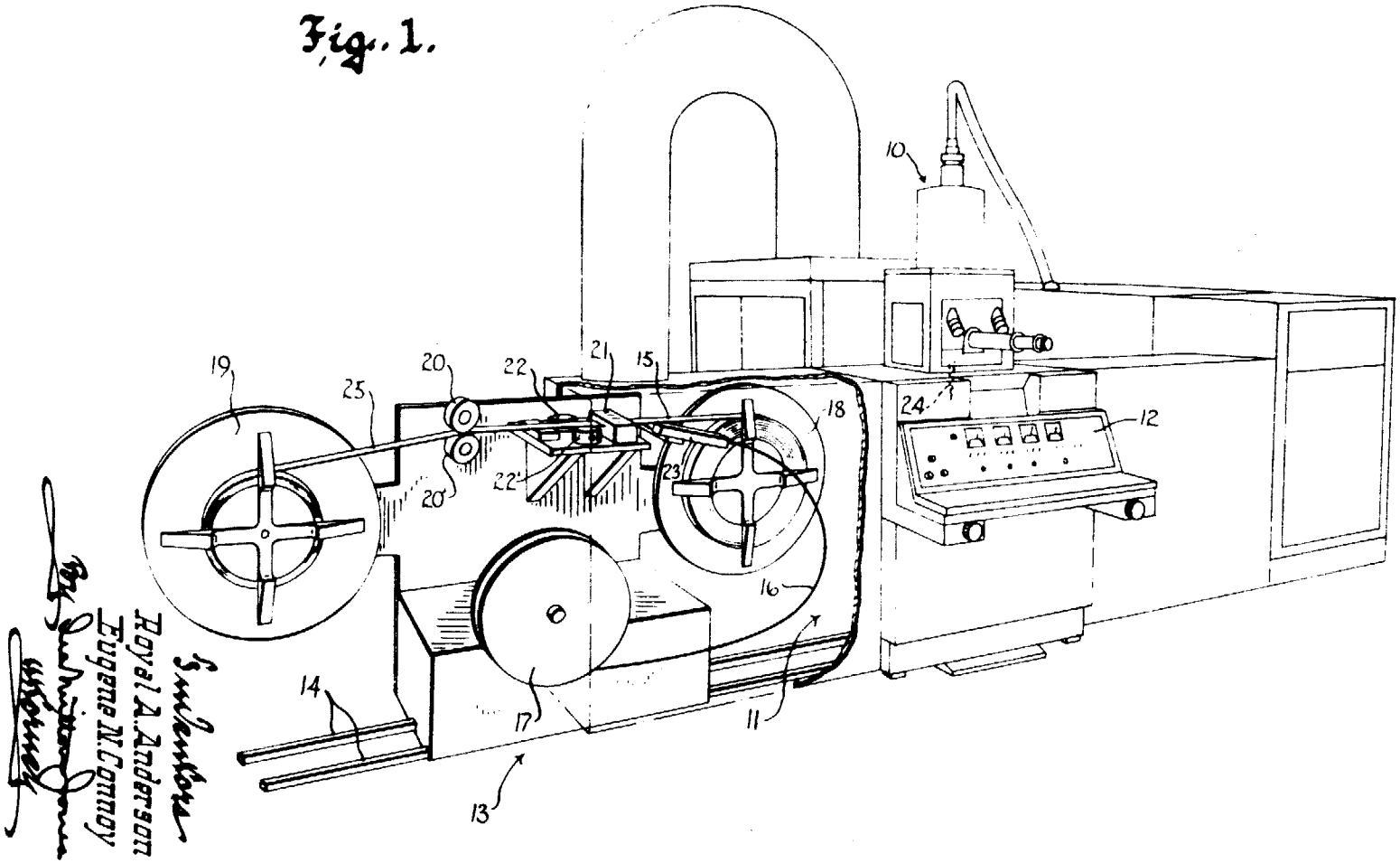
FIGURE 1 is a perspective view, more or less diagrammatically illustrating the apparatus employed in welding the high speed tool steel wire to one edge of a strip or band of carbon steel by means of the electron beam process.
Figure 2:
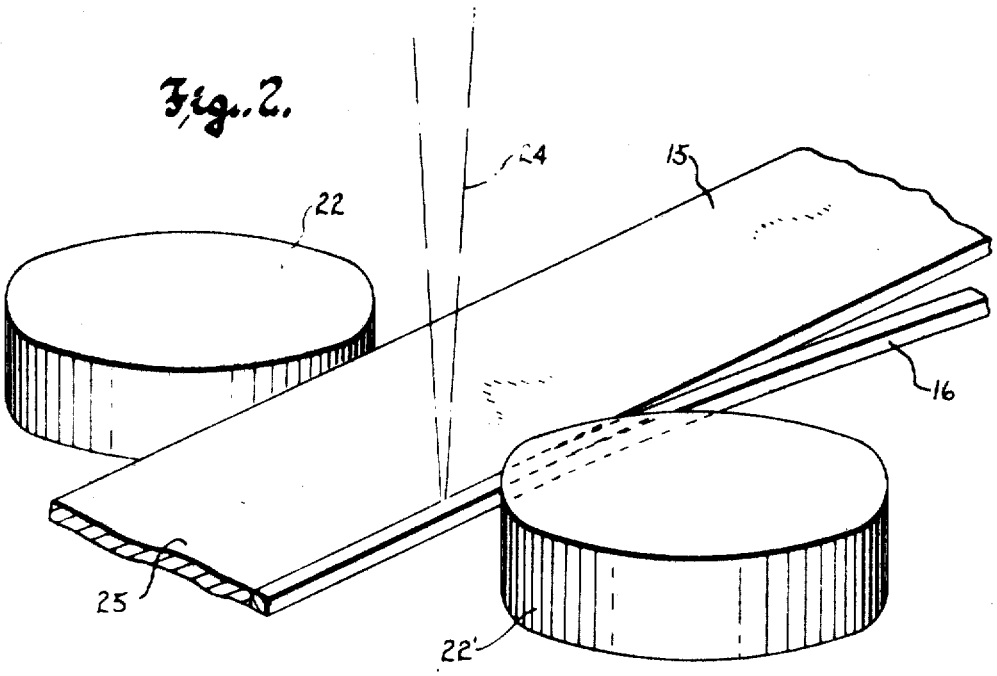
FIGURE 2 is a perspective view at an enlarged scale, of the portion of the backing band and high speed steel wire at which the welding takes place, to better illustrate the welding operation.
Figure 3:
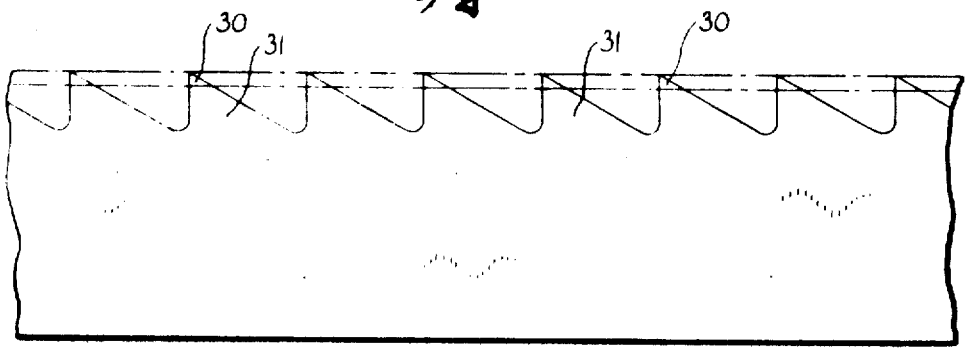
FIGURE 3 is a side view of a short length of saw band produced by the method of this invention.

With the fixture properly positioned in the vacuum [chamber 11, the electron beam—indicated at 24 in FIG- line of junction of the band and wire just after they leave URE 1, but better shown in FIGURE 2—impinges the] *chamber 11, the electron beam—indicated at 24 in FIGURE 1, but better shown in FIGURE 2—impinges the line of junction of the band and wire just after they leave* the clamping rolls, and welds the two together into the desired composite or bimetal band saw blade stock 25.

It is, of course, understood that after the fixture 13 is in place in the vacuum chamber and before the welder is turned on, the chamber must be sealed and evacuated, and when the proper degree of vacuum has been reached, the welding process may be started.

Experience has shown that this invention makes possible an exceptionally wide latitude in welding parameters. For instance, in experimental practice of the invention, the welding power was varied from a low of 240 watts to a high of 1080 watts, and the rate of welding, i.e. the rate at which the band and wire progress through the welding zone, was varied from six feet per minute to sixteen feet per minute with very little, if any, change in the quality of the weld; and rates of sixteen feet per minute are being used.

Although some camber in the composite or bimetal band 25 was experienced, it was relatively slight, being only about six inches in ten feet. This was easily corrected by simply passing the composite or bimetal band through a tempering muffle such as that shown in FIGURE 4 of the Connoy et al. Patent No. 3,089,945. Block 26 of FIGURE 4 indicates this straightening step.

After the composite band stock is straightened, it is annealed in any conventional manner to soften the weld area, block 27 of FIGURE 4. The annealed composite or bimetal band stock 25 is then dressed to *uniform* thickness, block 28 of FIGURE 4, by means of a belt-type grinder or any other suitable apparatus.

The annealed and dressed composite band stock 25 then has teeth of the desired size and pitch milled into it, block 29 of FIGURE 4. In milling the teeth into the composite band, the teeth are, of course, formed in that edge of the band at which the high speed steel wire is located, and they are so milled or formed that only the tip portion 30 of each tooth 31 is of high speed steel. All the rest of each tooth, like the backing band, is of 6150 carbon steel.

After the teeth are formed, they are set, block 32 of FIGURE 4, an operation which may be performed in any conventional manner. The band with its milled and set tee h is then heat treated, block 33 of FIGURE 4. This is done by moving the band endwise at about two and one-half to six feet per minute once through a high speed steel heat treating furnace having a muffle tube length of twelve feet and in which a selected [final muffle] *maximum* temperature of between 2150 and 2275° F. is maintained, and then double tempering the band at 1050° F. for two hours. Experience has shown that a muffle temperature of 2225° F. and a band travel of three feet per minute produces very good results, both with M2 and M3 high speed steel. The tips of the teeth, which were formed of M2 high speed steel had a hardness of 64–65 Rockwell C, and the tips of the teeth which were formed of M3 high speed steel had a hardness of 66-66.5 Rockwell C. In each instance the 6150 back had a hardness of 44–45 Rockwell C.

Photomicrographic examination of the weld zone securing the high speed steel wire to the backing band revealed an exceptionally fine and very narrow junction between the wire and the backing band, and every test that the saw blade could be subjected to showed it to be far superior to anything that had heretofore been achieved.

The greatly improved results obtained by this invention no doubt stem from the fact that the weld produced by the electron beam process is quite different from a weld produced by the conventional resistance welding method. The weld zone is capable of being annealed along with the rest of the bimetal band, which permits the teeth to be milled into the composite band, and during heat treatment the weld zone takes on the hardness of the tip portion of the teeth. But most significant is the fact that only a single-pass heat treatment is required to produce a band saw blade with the correct hardness and spring temper for the back of the band and a classically heat treated high speed steel cutting edge.

Although the electron beam welding that has been employed in the practice of this invention was conducted in a vacuum chamber, it is conceivable that the results achieved might be accomplished without requiring the entire band and wire to be placed in a vacuum chamber, as suggested for instance by the Radtke Patent No. 3,136,882. In any event, even though the work was done in a vacuum chamber, it was not in an absolute vacuum, since that condition is extremely difficult, if not impossible, to achieve. Hence, it would be more accurate to say that the welding is done in a [rarefield] *rarified* atmosphere, [and where this term is employed in the claims, it is intended to encompass] *which encompasses* not only the condition which obtains in the vacuum chamber of a Hamilton Standard electron beam welder, but also any atmospheric condition [amendable] *amenable* to electron beam welding.

*It is of course understood that in accordance with conventional heat treating practice a protective atmosphere is maintained in the muffle of the heat treating furnace, and that the term "classically heat treated" as used herein, simply means properly heat treated.*

From the foregoing description taken with the accompanying drawings, it will be apparent to those skilled in this art that the present invention represents a major "break through" in the production of band saw blades; and it should be understood that while a specific embodiment of the invention has been described, such changes in the precise embodiment of the hereindisclosed invention may be made as come within the scope of the claims.

What is claimed as our invention is:

1. The method of making a band saw blade wherein
(1) a wire of high speed cutting tool steel is welded directly to one edge of a flexible alloy steel band of substantially uniform width and thickness to form a bimetal band, and
(2) after straightening and annealing, the resulting bimetal band has teeth of the desired size and shape formed in the edge thereof at which the tool steel wire is located to form a saw blade in which only the tips of the teeth are formed of the tool steel, said method being characterized by:

A. the use of an electron beam to weld the high speed steel wire to the edge of the band; and B. simultaneously developing in the tool steel tooth tips the metallurgical characteristics of classically heat treated high speed steel along with maximum hardness, and bringing the remainder of the saw blade to a hardness on the order of 44–45 Rockwell C by
(1) passing the saw blade lengthwise once through the muffle of a heat treating furnace in which the final muffle temperature is maintained at a substantially constant level and at a selected value in the range of 2150°–2275° F.; and
(2) thereafter tempering the saw blade.

2. The method of claim 1, further characterized by the fact that the final muffle temperature is 2225° F. and the tempering is done at 1050° F.

3. The method of claim 1, further characterized by the fact that the [mffle] *muffle* is approximately twelve feet in length and the movement of the saw blade through the muffle is at a rate of two and one half to six feet per minute.

4. The method of claim 3, further characterized by the fact that the tempering is done by twice subjecting the saw blade for a period of two hours to a temperature of 1050° F.

*5. The method of making a band saw blade wherein*
*(1) a wire of high speed steel is welded directly to one edge of a flexible alloy steel band of substantially uniform width and thickness to form a bimetal band, and*
*(2) after straightening and annealing, the resulting bimetal band has teeth of the desired size and shape formed in the edge thereof at which the high speed steel wire is located to form a saw blade in which only the tips of the teeth are of high speed steel,*

*said method being characterized by:*

*A. the use of an electron beam to weld the high speed steel wire to the edge of the band; and*
*B. simultaneously developing in the high speed steel tooth tips the microstructure of properly heat treated high speed steel along with maximum hardness and bringing the remainder of the saw blade to a spring tempered hardness by*
*(1) passing the saw blade lengthwise once through a heating zone in which the blade is heated across its entire width to a substantially uniform temperature in the range of 2150–2275° F. while protecting the blade against any deleterious influence and*
*(2) thereafter tempering the saw blade.*

*6. The method of claim 5, wherein the temperature to which the saw blade is heated is 2225° F., and the tempering is done at 1050° F.*

References Cited

The following references, cited by the Examiner, are of record in the patented file of this patent or the original patent.

UNITED STATES PATENTS

| | | | |
|---|---|---|---|
| 2,987,610 | 6/1961 | Steigerwald. | |
| 3,034,379 | 5/1962 | Bernstein et al. | 76—112 |
| 1,535,096 | 4/1925 | Blum | 76—112 X |
| 2,422,561 | 6/1947 | Pavitt | |
| 2,683,923 | 7/1954 | | |

FOREIGN PATENTS

| | | |
|---|---|---|
| 1,010,969 | 11/1965 | Great Britain. |
| 974,524 | 1/1961 | Germany. |

BERNARD STICKNEY, Primary Examiner